United States Patent [19]

Bosso et al.

[11] 4,038,166
[45] July 26, 1977

[54] ELECTRODEPOSITABLE COMPOSITIONS

[75] Inventors: Joseph F. Bosso, Lower Burrell; Marco Wismer, Gibsonia, both of Pa.

[73] Assignee: PPG Industries, Inc., Pittsburgh, Pa.

[21] Appl. No.: 631,779

[22] Filed: Nov. 13, 1975

Related U.S. Application Data

[60] Division of Ser. No. 277,931, Aug. 4, 1972, Pat. No. 3,937,679, and a continuation-in-part of Ser. No. 158,063, June 29, 1971, abandoned, and Ser. No. 167,470, July 29, 1971, and Ser. No. 129,267, March 29, 1971, abandoned, and Ser. No. 100,825, Dec. 22, 1970, abandoned, and Ser. No. 100,834, Dec. 22, 1970, abandoned, said Ser. No. 158,063, is a division of Ser. No. 772,366, Oct. 31, 1968, abandoned, said Ser. No. 167,470, is a continuation-in-part of Ser. No. 840,847, July 10, 1969, abandoned, and Ser. No. 840,848, July 10, 1969, abandoned, and a continuation-in-part of said Ser. No. 100,825 and said Ser. No. 100,834, and Ser. No. 210,141, Dec. 20, 1971, abandoned, and Ser. No. 217,278, Jan. 12, 1972, abandoned, and said Ser. No. 100,825, said Ser. No. 100,834, is a continuation-in-part of Ser. No. 56,730, July 20, 1970, abandoned, which is a continuation-in-part of Ser. No. 772,366, Oct. 31, 1968, abandoned, said Ser. No. 129,267 is a continuation-in-part of said Ser. No. 100,825, which is a continuation-in-part of said Ser. No. 56,730.

[51] Int. Cl.$^2$ ............................................. C25D 15/00
[52] U.S. Cl. .................................................. 204/181
[58] Field of Search .......... 204/181; 260/29.3, 29.4 R, 260/29.4 UA, 831, 834, 844, 851, 856

[56] References Cited

U.S. PATENT DOCUMENTS

| | | | |
|---|---|---|---|
| 3,793,278 | 2/1974 | DeBona | 204/181 |
| 3,799,854 | 3/1974 | Jerabek | 204/181 |
| 3,925,180 | 12/1975 | Jerabek | 204/181 |
| 3,947,339 | 3/1976 | Jerabek et al. | 204/181 |

Primary Examiner—T. Tung
Attorney, Agent, or Firm—William J. Uhl

[57] ABSTRACT

Electrodepositable coating compositions having improved appearance, detergent resistance, salt-spray resistance and other improved properties are provided by the combination of a vehicle resin which is a water-dispersible quaternary onium (e.g., ammonium, sulfonium, phosphonium) salt-containing resin in combination with either an amine-aldehyde condensation product or a methylol-phenol ether, or the combination of the two. These compositions electrodeposit on the cathode. The properties of the coatings obtained make them highly useful as industrial finishes, either as primers or as one-coat finishes.

15 Claims, No Drawings

4,038,166

ELECTRODEPOSITABLE COMPOSITIONS

CROSS-REFERENCE TO RELATED APPLICATIONS

This application is a division of application Ser. No. 277,931, filed Aug. 4, 1972, now U.S. Pat. No. 3,937,679, and a continuation-in-part of copending applications (A) Ser. No. 158,063, filed June 29, 1971, now abandoned; (B) Ser. No. 167,470, filed July 29, 1971; (C) Ser. No. 129,267, filed Mar. 29, 1971, now abandoned; and (D) Ser. Nos. 100,825 and 100,834, both filed Dec. 22, 1970, now abandoned.

Application Ser. No. 158,063 (A), in turn, is a division of copending Application Ser. No. 772,366, filed Oct. 31, 1968, now abandoned; Application Ser. No. 167,470 (B) is, in turn a continuation-in-part of copending Applications Ser. Nos. 840,847 and 840,848, both filed July 10, 1969, both now abandoned, as well as a continuation-in-part of copending Applications Ser. Nos. 100,825 and 100,834 (D), both filed Dec. 22, 1970, now abandoned, and Application Ser. No. 210,141, filed Dec. 20, 1971, now abandoned, and Application Ser. No. 217,278, filed Jan. 12, 1972, now abandoned, Applications Ser. Nos. 100,825 and 100,834 (D) both, in turn, being continuations-in-part of copending Application Ser. No. 56,730, filed July 20, 1970, now abandoned, which in turn is a continuation-in-part of copending Application Ser. No. 772,366, filed Oct. 31, 1968, now abandoned; and Ser. No. 129,267 (C) is, in turn, a continuation-in-part of copending Application Ser. No. 100,825, filed Dec. 22, 1970, now abandoned, which is, in turn, a continuation-in-part of copending Application Ser. No. 56,730, filed July 20, 1970, now abandoned, which in turn is a continuation-in-part of copending Application Ser. No. 772,366, filed Oct. 31, 1968, now abandoned.

BACKGROUND OF THE INVENTION

In recent years, there has been developed a group of water dispersible quaternary onium salt-containing resins which have utility as coating compositions in general and particularly in aqueous electrodepositable compositions.

These resins are described in the prior copending applications set forth in the paragraph above, and are hereby incorporated by reference. These quaternary ammonium group containing resins as a class, providing highly useful cationic electrodepositable coatings, at times fail to meet the highest commercial standards of film appearance, detergent resistance and/or corrosion resistance, especially in areas where the standards set for these properties are critical.

DESCRIPTION OF THE INVENTION

It has now been found that substantial improvements in film appearance and film properties including detergent resistance and/or salt spray resistance can be achieved by combining these quaternary onium (e.g., ammonium, sulfonium, phosphonium) group-containing resins with either an amine-aldehyde condensate or a methylol-phenol ether, or a combination of both.

The catonic resins which can be utilized in preparing the compositions of this invention are characterized as ungelled, water-dispersable resins containing quaternary onium (preferably ammonium) salt groups, and preferably containing free epoxy groups. It has been found that the presently-preferred resins are based on polyepoxide resins, wherein the resultant resin contains at least one free epoxy group per average molecule and wherein the resin contains oxyalkylene groups and/or the salt forming the quaternary onium salt of an acid having a dissociation constant greater than $1 \times 10^{-5}$.

Generally, the quaternary onium salt may be the salt of boric acid and/or an acid having a dissociation constant greater than boric acid, including organic and inorganic acids. Upon solubilization, at least a portion of the salt is preferably a salt of an acid having a dissociation constant greater than about $1 \times 10^{-5}$. Preferably the acid is an organic carboxylic acid. The presently preferred acid is lactic acid.

The preferred resins contain at least one epoxy group and preferably contains about 0.05 percent to about 16 percent by weight nitrogen and at least about one percent of said nitrogen, preferably about 20 percent, more preferably about 50 percent and, most preferably, substantially all of the nitrogen being in the form of chemically-bound quaternary ammonium base salt groups; preferably the remainder of said nitrogen being in the form of amino nitrogen.

The epoxy group-containing organic material can be any monomeric or polymeric compound or a mixture of compounds having a 1,2-epoxy group. It is preferred that the epoxy-containing material have 1,2-epoxy equivalency greater than 1.0, that is, in which the average number of 1,2-epoxy groups per molecule is greater than one. It is preferred that the epoxy compound be resinous, that is, a polyepoxide, i.e., containing more than one epoxy group per molecule. The polyepoxide can be any of the well-known epoxides. Examples of these polyepoxides have, for example, been described in U.S. Pat. Nos. 2,467,171; 2,615,007; 2,716,123; 3,030,336; 3,053,855 and 3,075,999. A useful class of polyepoxides are the polyglycidyl ethers of polyphenols, such as Bisphenol A. These may be produced, for example, by etherification of a polyphenol with epichlorohydrin or dichlorohydrin in the presence of an alkali. The phenolic compound may be bis(4-hydroxyphenyl)2,2-propane, 4,4'-dihydroxybenzophenone, bis(4-hydroxyphenyl)1,1-ethane, bis(4-hydroxyphenyl)1,1-isobutane; bis(4-hydroxytertiarybutylphenyl)-2,2-propane, bis(2-hydroxynaphthyl)methane, 1,5-hydroxynaphthalene, or the like. Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)2,2-propane, and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid, and the like. Examples are diglycidyl adipate and diglycidyl phthalate.

Also useful are polyepoxides derived from the epoxidation of an olefinically unsaturated alicyclic compound. Included are diepoxides comprising, in part, one or more monoepoxides. These polyepoxides are non-phenolic and are obtained by epoxidation of alicyclic olefins, for example, by oxygen and selected metal catalysts, by perbenzoic acid, by acetaldehyde monoperacetate or by peracetic acid. Among such polyepoxides are the epoxy alicyclic ethers and esters which are well known in the art.

Another class of polyepoxides are those containing oxyalkylene groups in the epoxy molecule. Such oxyalkylene groups are typically groups of the general formula:

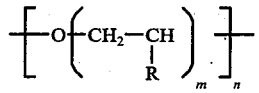

where R is hydrogen or alkyl, preferably lower alkyl (e.g., having 1 to 6 carbon atoms) and where, in most instances, m is 1 to 4 and n is 2 to 50. Such groups can be pendent to the main molecular chain of the polyepoxide or part of the main chain itself. The proportion of oxyalkylene groups in the polyepoxide depends upon many factors, including the chain length of of the oxyalkylene group, the nature of the epoxy and the degree of water solubility desired. Usually the epoxy contains at least about one percent by weight or more, and preferably 5 percent or more of oxyalkylene groups.

Some polyepoxides containing oxyalkylene groups are produced by reacting some of the epoxy groups of a polyepoxide, such as the epoxy resins mentioned above, with a monohydric alcohol containing oxyalkylene groups. Such monohydric alcohols are conveniently produced by oxyalkylating an alcohol, such as methanol, ethanol, or other alkanol, with an alkylene oxide. Ethylene oxide, 1,2-propylene oxide and 1,2-butylene oxide are especially useful alkylene oxides. Other monohydric alcohols can be, for example, the commercially available materials known as Cellosolves and Carbitols, which are monoalkyl ethers of polyalkylene glycols. The reaction of the monohydric alcohol and the polyepoxide is generally carried out in the presence of a catalyst. Formic acid, dimethylethanolamine, diethylethanolamine, N,N-dimethylbenzylamine and, in some cases, stannous chloride are useful for this purpose.

Similar polyepoxides containing oxyalkylene groups can be produced by oxyalkylating the epoxy resin by other means, such as by direct reaction with an alkylene oxide.

The polyepoxide employed to produce the foregoing epoxies containing oxyalkylene groups contain a sufficient number of epoxy groups so that the average number of residual epoxy groups per molecule remaining in the product after the oxyalkylation is greater than 1.0. Where oxyalkylene groups are present, the epoxy resin preferably contains from about 1.0 to about 90 percent or more by weight of oxyalkylene groups.

Other epoxy-containing compounds and resins include nitrogeneous diepoxides such as disclosed in U.S. Pat. 3,365,471; epoxy resins from 1,1-methylene bis(5-substituted hydantoin), U.S. Pat. No. 3,391,097; bisimide containing diepoxides, U.S. Pat. No. 3,450,711; epoxylated aminomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

Another class of resins which may be employed are acrylic polymers containing epoxy groups. Preferably these acrylic polymers are polymers formed by copolymerizing an unsaturated epoxy-containing monomer, such as, for example, glycidyl acrylate or methacrylate.

Any polymerizable monomeric compound containing at least one $CH_2=C<$ group, preferably in terminal position, may be polymerized with the unsaturated glycidyl compounds. Examples of such monomers include:

1. Monoolefinic and diolefinic hydrocarbons, that is, monomers containing only atoms of hydrogen and carbon, such as styrene, alpha-methyl styrene, alpha-ethyl styrene, isobutylene (2-methyl propene-1), 2-methylbutene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2-methyl-octene-1, 2,6-dimethyl-heptene-1, 2,6-dimethyl-octene-1, 2,3-dimethyl-decene-1, 2-methyl-nonadecene-1, ethylene, propylene, butylene, amylene, hexylene, butadiene-1,3, isopropene, and the like;

2. Halogenated monoolefinic and diolefinic hydrocarbons, that is monomers containing carbon, hydrogen, and one or more halogen atoms, such as alpha-chlorostyrene, alpha-bromostyrene, 2,5-dichlorostyrene, 2,5-dibromostyrene, 3,4-dichlorostyrene, ortho-, meta- and para-fluoro- styrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptent, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-fluoroethylene, 1,1,-diiodoethylene, 1,1,2,2-tetrafluoroethylene, 1-chloro-2,2,2-trifluoroethylene, chlorobutadiene and other halogenated diolefinic compounds;

3. Esters of organic and inorganic acids, such as vinyl acetate, vinyl propionate, vinyl butyrate, vinyl isobutyrate, vinyl valarate, vinyl caproate, vinykl enanthate, vinyl benzoate, vinyl toluate, vinyl p-chlorobenzoate vinyl-o-chlorobenzoate and similar vinyl halobenzoates, vinyl-p-methoxybenzoate, vinyl-o-methoxybenzoate, vinyl-p-ethoxybenzoate, methyl metha acrylate, ethyl methacrylate, propyl methacrylate, butyl methacrylate, amyl methacrylate, hexyl methacrylate, heptyl methacrylate, octyl methacrylate, decyl methacrylate, methyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, iospropenyl m-chlorobenzoate, isopropenyl toluate, isopropenyl alpha-chloroacetate andisopropenyl alpha-bromopropionate;

Vinyl alpha-chloroacetate, vinyl alpha-bromoacetate, vinyl alphachloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride allyl iodide, ally chlorocarbonate, allyl nitrate, allyl thiocyanate, allyl formate, allyl acetate, allyl propionate, allyl butyrate, allyl valerate, allyl caproate, allyl-3,5,5-trimethyl hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1-butene-4-ol, 2-methyl-butene-4-ol, 2(2,2-dimethylpropyl)-1-butene-4-ol, and 1-pentene-4-ol;

Methyl alpha-chloroacrylate, methyl alpha-bromoacrylate, methyl alpha-fluroracrylate, methyl alpha-iodoacrylate ethyl alpha, chloroacrylate, propyl alpha-chloroacrylate, isopropyl alpha-bromoacrylate, amyl alpha-chloroacrylate, octyl alpha-chloroacrylate, 3,5,5-trimethylhexyl alphachloroacrylate, decyl alpha-chloroacrylate, methyl alpha-cyanoacrylate, ethyl alpha-cyanoacrylate, amyl alpha-cyanoacrylate and decyl alpha-cyano acrylate;

Dimethyl maleate, diethyl maleate, diallyl maleate, dimethyl fumarate, diethyl fumarate, dimethallyl fumarate and diethyl glutaconate;

4. Organic nitriles, such as acrylonitrile, methacrylonitrile, ethacrylonitrile, 3-octenenitrile, crotonitrile, oleonitrile, and the like.

In carrying out the polymerization reaction, techniques well known in the art may be employed. A peroxygen type catalyst is ordinarily utilized. Diazo compounds or redox catalyst systems can also be employed as catalysts.

The arylic polymer may likewise be prepared with monomers of the type such that the final polymer contains potential crosslinking sites. Such monomers include acrylamides or methacrylamides, their N-methylol or N-methylol ether derivatives; unsaturated monomers containing capped isocyanate groups, or aziridyl groups; and hydroxy-containing unsaturated monomers, for example, hydroxyalkyl acrylates.

Another method of producing acrylic polymers which may be utilized in this invention is to react an acrylic polymer containing reactive sites, such as carboxyl groups or hydroxyl groups, secondary amine groups or other active hydrogen-containing sites, with an epoxy-containing compound such as the diglycidyl ether of Bisphenol A or other polyepoxides as enumerated elsewhere herein, to provide an epoxy group-containing acrylic polymer.

Vinyl addition polymers which contain alicyclic unsaturation can be epoxidized to form an epoxy group-containing polymer.

Yet another class of polymers which are useful in preparing the resins of this invention are isocyanate group-containing polyurethanes. The isocyanate-terminated polyurethane prepolymers employed as starting materials according to the present invention may be obtained by the reaction of a selected polymeric glycol. The polyurethane polymers include those which are prepared from polyalkylene ether glycols and diisocyanates. The term "polyalkylene ether glycol" as used herein refers to a polyalkylene ether which contains terminal hydroxy groups. They are sometimes known as polyoxyalkylene glycols, polyalkylene glycols, or polyalkylene oxide glycols, or dihydric polyoxyalkylenes. Those useful in preparing the products of this invention may be represented by the formula HO(-RO)$_n$H, in which R stands for an alkylene radical and n is an integer. Glycols containing a mixture of radicals, as in the compound HO(CH$_2$OC$_2$H$_4$O)$_n$H, or HO(C$_2$H$_4$O)$_n$(C$_3$H$_6$O)$_m$(C$_2$H$_4$O)$_n$H, can be used. These glycols are either viscous liquids or waxy solids. Polytetramethylene ether glycols, also known as polybutylene ether glycols, may be employed. Polyethylene ether and polypropylene ether glycols, having the above-indicated formula, are among the preferred glycols. The presently preferred glycols are polypropylene glycols with a molecular weight between about 300 and about 1000.

Any of a wide variety of organic polyisocyanates may be employed in the reaction, including aromatic aliphatic, and cycloaliphatic diisocyanates and combinations of these types.

Instead of the hydrocarbon portion of the polyether glycols used in forming the polyurethane products being entirely alkylene, it can contain arylene or cycloalkylene radicals together with the alkylene radicals as, for example, in the condensation product of a polyalkylene ether glycol with alpha, alpha'-dibromo-p-xylene in the presence of alkali. In such products, the cyclic groups inserted in the polyester chain are preferably phenylene, naphthylene or cyclohexylene radicals or those radicals containing alkyl or alkylene substituents, as in the tolylene, phenylethylene or xylene radicals.

Also included in the polyurethane products are those made from a substantially linear polyester and an organic diisocyanate of the previously described type. Products of this sort are described in U.S. Pat. Nos. 2,621,166; 2,625,531 and 2,625,532. The polyesters are prepared by reacting together glycols and dicarboxylic acids. Another useful group of compounds for this purpose are the polyester amide resins having terminal hydroxyl groups. The preferred polyesters may be represented by the formula HO—B—OOC—B'—COO$_n$—BOH, in which B and B' are hydrocarbon radicals derived from the glycol and dicarboxylic acid respectively and n is an integer. In the preparation of these polyesters, the glycol is used in at least slight excess so that the polyesters contain terminal hydroxyl groups which are available for reaction with the isocyanates. The same polyisocyanates and reaction conditions useful in preparing polyurethanes from the polyalkylene ether glycols are also useful with the polyesters.

Polyurethane glycols may also be reacted with an organic polyisocyanate-terminated polyurethanes for use as starting materials in the present invention. The starting polyurethane glycol is prepared by reacting a molar excess of a polymeric glycol with an organic diisocyanate. The resulting polymer is a polyurethane containing terminal hydroxyl groups which may then be further reacted with additional polyisocyanate to produce the starting isocyanate-terminated polyurethane prepolymer.

Another starting polyurethane prepolymer may be such as disclosed in U.S. Pat. No. 2,861,981, namely, those prepared from a polyisocyanate and the reaction product of an ester of an organic carboxylic acid with an excess of a saturated aliphatic glycol having only carbon atoms in its carbon chain and a total of 8 to 14 carbon atoms, at least one two-carbon branch per molecule, and having terminal hydroxy groups separated by at least six carbon atoms.

It is obvious, from the above-described methods by which the polyurethane reaction products may be prepared and from the reactants used, that these products will contain a plurality of intralinear radicals of the formula -NH-CO-O-X-O-CO-NH-, wherein the bivalent radical —O—X—O— is obtained by removing the terminal hydrogen atoms of the polymeric glycol, said glycol being selected from the group consisting of polyalkylene ether glycols, polyurethane glycols, polyalkylene arylene ether glycols, polyalkylenecycloalkylene ether glycols, polyalkylene ether-polythioether glycols, polyester amide glycols of the formula:

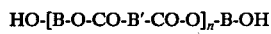
HO-[B-O-CO-B'-CO-O]$_n$-B-OH where B and B' are hydrocarbon radicals and $n$ is an integer, and that a typical isocyanate-terminated poluyurethane polymer produced from diisocyanates and dihydric glycols will, on an average, contain (at a 2:1 NCO:OH ratio) a plurality of intralinear molecules conforming to the formula:

OCN-Y-NH-CO-O-X-O-CO-NH-Y-NCO wherein —O—X—O— has the value given previously and Y is the polyisocyanate hydrocarbon radical.

Polyurethane Prepolymer Preparation

In the preparation of the starting polyurethane polymer, an excess of the organic polyisocyanate of the polymeric glycol is used, which may be only a slight excess over the stoichiometric amount (i.e., one equivalent of polyisocyanate for each equivalent of the polymeric glycol). In the case of a diisocyanate and a dihydric polyalkylene ether, the ratio of NCO to OH of the polyol will be at lease one and may be up to a 3:1 equivalent ratio. The glycol and the isocyanate are ordinarily reacted by heating with agitation at a temperature of 50° C. to 130° C., preferably 70° C. to 120° C. The ratio of organic polyisocyanate compound to polymeric glycol is usually and preferably between about 1.3:1 and 2.0:1.

The reaction is preferably, but not necessarily, effected in the absence of a solvent, when the prepolymer is a fluid at processing temperatures. When it is not, or when it is desired to employ a solvent, convenient solvents are inert organic solvents having a boiling range above about 90° C. when the reaction is to be carried out in open equipment. Lower boiling solvents may, of course, be used where the reaction is carried out in closed equipment to prevent boiling off the solvent at the temperatures of the reaction. Solvents boiling at substantially more than 140° C. are difficult to remove from a final chain-extended elastomer at desirable working temperatures, although it will be obvious that higher boiling solvents may be employed where the excess solvent is removed by means other than by heating or distillation. The solvent, when used, may be added at the beginning, at an intermediate point, or at the end of the prepolymer reaction stage, or after cooling of the formed prepolymer. The solvents to be used are preferably those in which the reactants have some solubility but in which the final chain-extended product is insoluble. Ketones, tertiary alcohols and esters may be used. The aliphatic hydrocarbon solvents such as the heptanes, octanes and nonanes, or mixtures of such hydrocarbons obtained from naturally-occurring petroleum sources such as kerosene, or from synthetically prepared hydrocarbons, may sometimes by employed. Cycloaliphatic hydrocarbons such as methylcyclohexane and aromatic hydrocarbons such as toluene may likewise be used. Toluene and isopropyl acetate are preferred solvents. The amount of solvent used may be varied widely. From 25 to 400 parts of solvent per 100 parts of glycol have been found to be operable. The excess solvent, where large amounts are employed, may be separated partially or completely from the polymer prior to emulsification in the water solution. If an emulsion technique is to be employed in the chain extension, sometimes the excess solvent is useful and is allowed to remain during the emulsification stage.

The reactants are cooked for a period sufficient to react most, if not all, of the hydroxy groups, wherafter the prepolymer is allowed to stand and the free NCO content determined.

Usual pHs are employed during preparation of the prepolymer, the reaction preferably being maintained substantially neutral. Bases accelerate the reaction, acids retard the reaction, and preferably neither are added.

These isocyanate group-containing polyurethanes are then reacted with an epoxy-containing compound such as glycidol, for example, at temperture s of about 25° C. to about 45° C., usually in the presence of a catalyst which promotes urethane formation.

In the process of the invention, the epoxy group-containing compound is reacted with an amine salt to form quaternary amine salt groupcontaining resins.

The process of this invention can be used to produce essentially epoxy group-free resins as well as epoxy group-containing resins. Where the epoxide is reacted with at least about a stoichiometric amount of amine salt, essentially epoxide group-free resins are produced; where resin containing free epoxide groups are desired, the ratio of starting polyepoxide to amine salt is selected so as to provide an excess of epoxy groups, thereby producing a resin containing free unreacted epoxide groups. Epoxy-free resin can also be provided by hydrolysis or post reaction of the epoxide amine salt reaction product.

Examples of salts which may be employed include salts of ammonia; primary, secondary and tertiary amines, and preferably tertiary amines; salts of boric acid or an acid having a dissociation constant greater than that of boric acid and preferably an organic acid having a dissociation constant greater than about 1 × 10$^{-5}$. The presently preferred acid is lactic acid. Such acids include boric acid, lactic acid, acetic acid, formic acid, propionic acid, butyric acid, hydrochloric acid, phosphoric acid and sulfuric acid. The amines may be unsubstituted amines or amines substituted with nonreactive constituents such as halogens or hydroxylamines. Specific amines include dimethylethanolamine, salts of boric, lactic, propionic, formic, butyric, hydrochloric, phosphoric and sulfuric, or similar salts in triethylamine, diethylamine, trimethylamine, diethylamine, dipropylamine, 1-amino-2-propanol, and the like. Also included are ammonium borate, ammonium lactate, ammonium acetate, ammonium chloride, ammonium phosphate, as well as other amine and ammonium salts as defined above.

A distant class of amine compounds within the broader class is amine containing one or more secondary or tertiary amino groups and at least one hydroxyl group.

In most cases, the hydroxyl amine employed corresponds to the general formula:

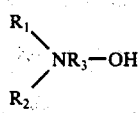

where $R_1$ and $R_2$ are, preferably, methyl, ethyl or lower alkyl groups, but can be essentially any other organic radical, so long as they do not interfere with the desired reaction. Benzyl, alkoxyalkyl and the like are examples. $R_1$ can also be hydrogen. The nature of the particular groups is less important than the presence of a secondary or tertiary amino nitrogen atom, and thus higher alkyl, aryl, alkaryl, aralkyl, and substituted groups of the types can be present. The group represented by $R_3$ is a divalent organic group, such as alkylene or substituted alkylene, e.g., oxyalkylene or poly(oxyalkylene), or even arylene, alkarylene or substituted arylene. $R_3$ can also be an unsaturated group, e.g., an alkylene group such as —CH=CH— or

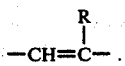

Other groups represented by $R_3$ include cyclic or aromatic groups. One type of useful amine, for instance, is represented by the formula:

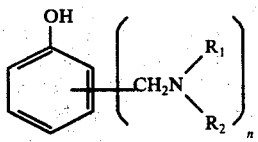

where $n$ is 1 to 3. Dialkanolamines, of the general formula $R_1N(R_3OH)_2$, and trialkanolamines, of the general formula $N(R_3OH)_3$, are also useful.

Some examples of specific amines are as follows: dimethylethanolamine, dimethylpropanolamine, dimethylisopropanolamine, dimethylbutanolamine, diethylethanolamine, ethylethanolamine, methylethanolamine, N-benzylethanolamine, diethanolamine, triethanolamine, dimethylaminomethyl phenol, tris(dimethylaminomethyl)phenol, 2-[2-(dimethylamino)ethoxy]-ethanol, 1-[1-(dimethylamino)-2-propoxy]-2-propanol, 2-(2-[2-(dimethylamino)ethoxy]ethoxy)ethanol, 1-[2-(dimethylamino)ethoxy]-2-propanol, 1-(1-[dimethylamino)-2-propoxy]-2-propoxy)-2-propanol, benzyl dimethyl amine.

Another distinct class of amine compound within the broader class is any amine containing one or more secondary or tertiary amino groups and

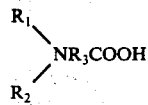

where $R_1$ and $R_2$ are each preferably methyl, ethyl, or other lower alkyl groups, but can be essentially any other radical, so long as they do not interfere with the desired reaction. Benzyl, alkoxyalkyl, and the like are examples. $R_1$ can also be hydrogen. The nature of the particular groups is less important than the presence of a secondary or tertiary amino nitrogen atom, and thus higher alkyl, aryl, alkaryl, and substituted groups of these types can be present. The group represented by $R_3$ is a divalent organic group, such as alkylene or substituted alkylene, e.g., oxyalkylene or poly(oxyalkylene), or less desirably, arylene, alkarylene or substituted arylene. $R_3$ can also be an unsaturated group, e.g., an alkylene group.

Such amines can be prepared by known methods. For example, an acid anhydride, such as succinic anhydride, phthalic anhydride or maleic anhydride, can be reacted with an alkanolamine, such as dimethylethanolamine or methyldiethanolamine; the group represented by $R_3$ in the amines produced in such cases contain ester groups. Other types of amines are provided, for example, by reacting an alkylamine with an alkyl acrylate or methacrylates such as methyl or ethyl acrylate or methacrylate, as described in U.S. Pat. No. 3,419,525. Preferably, the ester group is subsequently hydrolyzed to form a free carboxyl group. Other methods for producing amines of different types can also be employed.

It can be seen that the groups represented by $R_3$ can be of widely varying types. Some examples are: —R'—, —R'OCOR'—, and $(R'O)_nCOR'$—, where each R' is alkylene, such as —CH$_2$CH$_2$—,

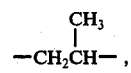

etc., or alkenylene, such as —CH=CH—such as —CH=CH—, and $n$ is 2 to 10 or higher. Other groups represented by R' include cyclic or aromatic groups.

Some examples of specific amines are as follows:

N,N-dimethylaminoethyl hydrogen maleate
N,N-diethylaminoethyl hydrogen maleate
N,N-dimethylaminoethyl hydrogen succinate
N,N-dimethylaminoethyl hydrogen phthalate
N,N-dimethylaminoethyl hydrogen hexahydrophthalate
2-(2-dimethylaminoethoxy)ethyl hydrogen maleate
1-methyl-2-(2-dimethylaminoethoxy)ethyl hydrogen maleate
2-(2-dimethylaminoethoxy)ethyl hydrogen succinate
1,1-dimethyl-2-(2-dimethylaminoethoxy)ethyl hydrogen succinate
2-[2-(2-dimethylaminoethoxy)ethoxy]ethyl hydrogen maleate
beta-(dimethylamino)propionic acid
beta-(dimethylamino)isobutyric acid
beta-(dimethylamino)propionic acid ;p0 1-methyl-2-(dimethylamino)ethyl hydrogen maleate
2-(methylamino)ethyl hydrogen succinate
3-(ethylamino)propyl hydrogen maleate
2[2-(dimethylamino)ethoxy]ethyl hydrogen adipate
N,N-dimethylaminoethyl hydrogen azelate
di(N,N-dimethylaminoethyl(hydrogen tricarballylate
N,N-dimethylaminoethyl hydrogen itaconate
1-(1-1(dimethylamino)-2-propoxy]-2-propoxy)-2-propyl hydrogen maleate
2-[2-(2-[2-(dimethylamino)ethoxy]ethoxy)ethoxy]ethyl hydrogen succinate.

In one embodiment, the epoxy compounds described above may be reacted with an ester of boric acid or a compound which can be cleaved to form boric acid in a medium containing water and preferably an aminocontaining boron ester and/or a tertiary amine salt of boric acid to produce the epoxy reaction products. The boron compound component utilized in producing the reaction products can be, for example, any triorganoborate in which at least one of the organic groups is substituted with an amino group. Structurally, such esters are esters of boric acid or a dehydrated boric acid such as metaboric acid and tetraboric acid, although not necessarily produced from such acids. In most cases the boron esters employed correspond to one of the general formulas:

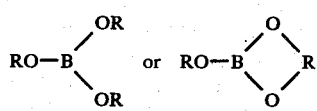

where the R groups are the same or different organic groups. The groups represented by R above can be virtually any organic group, such as hydrocarbon or substituted hydrocarbon, usually having not more than 20 carbon atoms and preferably not more than about 8 carbon atoms. The preferred esters have alkyl groups or polyoxyalkyl groups. At least one of the organic groups contains an amine group, i.e., a group of the structure:

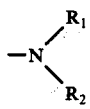

where $R_1$ and $R_2$ are hydrogen or preferably methyl, ethyl or other lower alkyl groups, but can be essentially any other organic radical, so long as they do not interfere with the desired reaction. The nature of the particular groups is less important than the presence of an amino nitrogen atom, and thus higher alkyl, aryl, alkaryl, aralkyl and substituted groups of these types can be present. While both $R_1$ and $R_2$ can be hydrogen (i.e., the amino group is a primary amino group), it is preferred that at least one be an alkyl or other organic group, so that the amino group is secondary or tertiary.

The preferred boron esters correspond to the formula:

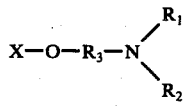

where X has the structure:

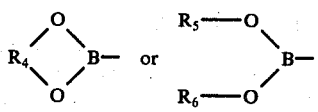

$R_3$ and $R_4$ being divalent organic radicals, such as alkylene or substituted alkylene, e.g., oxyalkylene or poly(oxyalkylene), or less desirably, arylene, alkarylene or substituted arylene. $R_5$ and $R_6$ can be alkyl, substituted alkyl, aryl, alkaryl, or other residue from essentially any monohydroxy alcohol derived by removal of the hydroxyl group. $R_5$ and $R_6$ can be the same or different.

Examples of boron esters within the above class include:

2-(beta-dimethylaminoisopropoxy)-4,5-dimethyl-1,3,2-dioxaborolane 2-(beta-diethylaminoethoxy)-4,4,6-trimethyl-1,3,2-dioxaborinane
2-(beta-dimethylaminoethoxy)4,4,6-trimethyl-1,3,2-dioxaborinane
2-(beta-diisopropylaminoethoxy)-1,3,2-dioxaborinane
2-(beta-dibutylaminoethoxy)-4-methyl-1,3,2-dioxaborinane
2-(beta-diethylaminoethoxy)-1,3,2-dioxaborinane
2-(gamma-aminopropoxy)-4-methyl-1,3,2-dioxaborinane
2-(beta-methylamino-ethoxy)-4,4,6-trimethyl-1,3,2-dioxaborinane
2-(beta-ethylaminoethoxy)-1,3,6-trioxa-2-boracyclooctane
2-(gamma-dimethylaminopropoxy)-1,3,6,9-tetraoxa-2-boracycloundecane
2-(beta-dimethylaminoethoxy)-4-4(4-hydroxybutyl)-1,3,2-dioxaborolane
Reaction product of $(CH_3)_2NCH_2CH_2OH$ + Lactic acid + $B_2O_3$ + neopentyl glycol A number of such boron esters are known. Many are described, for example, in U.S. Pat. Nos. 3,301,804 and 3,257,442. They can be prepared by reacting one mole of boric acid (or equivalent boric oxide) with at least 3 moles of alcohol, at least one mole of the alcohol being an aminosubstituted alcohol. The reaction is ordinarily carried out by refluxing the reactants with removal of the water formed.

The amino salts and the epoxy compound are reacted by mixing the components, preferably in the presence of a controlled amount of water. The amount of water employed should be that of water which allows for smooth reaction with retention of epoxy groups but not sufficient to cause extremely slow or non-reaction. Typically, the water is employed on the basis of about 1.75 percent to about 20 percent by weight based on the total reaction mixture solids and preferably about 2 percent to about 15 percent by weight, based on total reaction solids.

Another measure of the amount of water which may be employed is the equivalent ratio of water to amine nitrogen present in the reaction mixture. Typically the equivalent ratio of water to amine nitrogen is controlled between about 1.3 and about 16 equivalents of water per equivalent of amine nitrogen. Preferably, the ratio of water to amine nitrogen is controlled between about 1.5 and about 10.6 equivalents of water per equivalent of amine nitrogen.

The reaction temperature may be varied between about the lowest temperature at which the reaction reasonably proceeds, for example, room temperature, or in the usual case, slightly above ordinary room temperature to a maximum temperature between about 100° C. and about 110° C.

A solvent is not necessary, although one is often used in order to afford better control of the reaction. Aromatic hydrocarbons or monoalkyl ethers of ethylene glycol are suitable solvents. The proportions of the amine salt and the epoxy compound can be varied and the optimum proportions depend upon the particular reactants. Ordinarily, however, from about one part to about 50 parts by weight of the salt per 100 parts of epoxy compound are employed. The proportions are usually chosen with reference to the amount of nitrogen, which is typically from about 0.05 to about 16 percent based on the total weight of the amine salt and the epoxy compound. Since the amine salt reacts with the epoxide groups of the epoxy resin employed, in order to provide an epoxy group-containing resin, the stoichiometric amount of amine employed should be less than the stoichiometric equivalent of the epoxide groups present, so that the final resin is provided with one epoxy group per average molecule.

Phosphonium group containing resins can be prepared by reacting the above epoxy compounds with a phosphine in the presence of an acid to form quaternary phosphonium base group containing resins.

The phosphine employed may be virtually any phosphine which does not contain interferring groups. For example, the phosphine may be aliphatic, aromatic or alicyclic. Examples of such phosphines include lower trialkyl phosphine, such as trimethyl phosphine, triethyl phosphine, tripropyl phosphine, tributyl phosphine, mixed lower alkyl phenyl phosphines such as phenyl dimethyl phosphine, phenyl diethyl phosphine, phenyl dipropyl phosphine, diphenyl methyl phosphine, diphenyl ethyl phosphine, diphenyl propyl phosphine, triphenyl phosphine, alicyclic phosphines such as tetramethylene methyl phosphine and the like.

The acid employed may be virtually any acid which forms a quaternary phosphonium salt. Preferably the acid is an organic carboxylic acid. Examples of the acids which may be employed are boric acid, lactic acid, formic acid, acetic acid, propionic acid, butyric acid, hydrochloric acid, phosphoric acid, and sulfuric acid. Preferably the acid is an acid having a dissociation constant greater than about $1 \times 10^{-5}$.

The ratio of phosphine to acid is not unduly critical. Since one mole of acid is utilized to form one mole of phosphonium group, it is preferred that at least about one mole of acid be present for each mole of desired phosphine-to-phosphonium conversion.

The phosphine/acid mixture and the epoxy compound are reacted by mixing the components, sometimes at moderately elevated temperatures. The reaction temperature is not critical and is chosen depending upon the reactants and their rates. Frequently the reaction proceeds well at room temperature or temperatures up to 70° C., if desired. In some cases, temperatures as high as about 110° C. or higher may be employed. A solvent is not necessary, although one is often used in order to afford better control of the reaction. Aromatic hydrocarbons, monoalkyl ethers of ethylene glycol, and aliphatic alcohols are suitable solvents. The proportions of the phosphine and the epoxy compound can be varied and the optimum proportions depend upon the particular reactants. Ordinarily, however, from about one part to about 50 parts by weight of the phosphine per 100 parts of epoxy compound is employed. The proportions are usually chosen with reference to the amouont of phosphine, which is typically from about 0.1 to about 35 percent, based on the total weight of the phosphine and the epoxy compound.

Sulfonium group containing resins can be prepared by reacting the above epoxy compounds with a sulfide in the presence of an acid to form quaternary sulfonium base group containing resins.

The sulfide employed may be virtually any sulfide which reacts with epoxy groups and which does not contain interfering groups. For example, the sulfide may be aliphatic, mixed aliphatic-aromatic, aralkyl or cyclic. Examples of such sulfides include dialkyl sulfides such as diethyl sulfide, dipropyl sulfide, dibutyl sulfide, dihexyl sulfide, phenyl sulfide or alkyl phenyl sulfides such as diphenyl sulfide, ethyl phenyl sulfide, alicyclic sulfides such as tetramethylene sulfide, pentamethylene sulfide, hydroxyl alkyl sulfides such as thiodiethanol, thiodipropanol, thiodibutanol and the like.

The acid employed may be virtually any acid which forms a quaternary sulfonium salt. Preferably the acid is an organic carboxylic acid. Examples of acids which may be employed are boric acid, formic acid, lactic acid, acetic acid, propionic acid, butyric acid, hydrochloric acid, phosphoric acid and sulfuric acid. Preferably the acid is an acid having a dissociation constant greater than about $1 \times 10^{-5}$.

The ratio of sulfide to acid is not unduly critical. Since one mole of acid is utilized to form one mole of sulfonium group, it is preferred that at least about one mole of acid be present for each mole of desired sulfide-to-sulfonium conversion.

The sulfide/acid mixture and the epoxy compound are reacted by mixing the components, usually at moderately elevated temperatures such as 70-110° C. A solvent is not necessary, although one is often used in order to afford better control of the reaction. Aromatic hydrocarbons, monoalkyl ethers of ethylene glycol, aliphatic alcohols are suitable solvents. The proportions of the sulfide to the epoxy compound can be varied and the optimum proportions depend upon the particular reactants. Ordinarily, however, from about one part to about 50 parts by weight of the sulfide per 100 parts of epoxy compound is employed. The proportions are usually chosen with reference to the amount of sulfur, which is typically from about 0.1 to about 25 percent, based on the total weight of the sulfide and the epoxy compound.

Since the sulfide or phosphine react with the epoxy group, where epoxy group-containing products are desired, less than an equivalent of sulfide or phosphine should be employed so that the resultant resin has one epoxy group per average molecule.

Where it is desired to incorporate boron into the resin molecule, one method is to incorporate boron by means of an amine borate or nitrogen-containing ester as described in copending Application Ser. No. 100,825, filed Dec. 22, 1970, the disclosure of which is hereby incorporated by reference. The boron compound reacts with available epoxy groups to provide quaternary ammonium borate groups in the resin molecule.

The reaction of the boron compound may be concluded simultaneously with sulfonium or phosphonium group formation since the reaction conditions are similar.

The particular reactants, proportions and reaction conditions should be chosen in accordance with considerations well-known in the art, so as to avoid gelation of the product during the reaction. For example, excessively severe reaction conditions should not be employed. Similarly, compounds having reactive substituents should not be utilized along with epoxy compounds with which those substituents might react adversely at the desired conditions.

The products forming the resin of the invention may be crosslinked to some extent; however, it remains soluble in certain organic solvents and can be further cured to a hard, thermoset state. It is significantly characterized by its epoxy content and chemically-bound quaternary onium content.

Aqueous compositions containing the above reaction products are highly useful as coating compositions and can be applied by any conventional method, such as by dipping, brushing, etc. They are, however, eminently suited to application by electrodeposition.

Where the resin of the invention was prepared employing at least in part a salt of an acid having a dissociation constant greater than $1 \times 10^{-5}$, it is not necessary to add a solubilizing agent to the product to obtain a suitable aqueous electrodepositable composition, although an acid or acidic solubilizing agent can be added if desired. Where boric acid salts or similar boron compounds, as described above, are employed to prepare the resin without the presence of a salt of an acid having a dissociation constant greater than $1 \times 10^{-5}$, compositions within the scope of this invention can be prepared by adding such an acid, the stronger acid replacing the boron compound in the resin and the boron compound forming substantially undissociated boric acid remaining in the aqueous media and being at least partially codeposited with the resin.

The presence of a boron compound in the electrodeposited film is of substantial benefit in that boron compounds apparently catalyze the cure of the deposited film, allowing lower cure temperatures and/or harder films.

The acid or acidic solubilizing agent may be any acid having a dissociation constant greater that $1 \times 10^{-5}$. Preferably, the acid or acidic solubilizing agent should be an organic acid having a dissociation constant greater than about $1 \times 10^{-5}$, the presently preferred acid being lactic acid. The addition of acid aids in stabilizing the resin, since the epoxy may tend to further polymerize on storage under highly alkaline conditions. In some cases, the acid also helps to obtain more complete dissolution of the resin. It is also desirable to electrodeposit these coatings from an acidic or only slightly basic solution (e.g., having a pH between about 3 and about 8.5), and the addition of acid thus is often useful to achieve the desired pH.

Where a carboxyl amine is employed in forming the resin of the invention, the resultant resin contains a Zwitterion, or internal salt, that is, an interaction between the quaternary group formed and the carboxyl group present, the carboxyl group displaying a dissociation constant greater than $1 \times 10^{-5}$. The resultant resin is inherently self-solubilized without the use of external solubilizing agents.

The resin of the invention, when placed in a water-containing medium, such as an electrodeposition high solids feed concentrate or the electrodeposition bath, changes character. Since frequently the boron, if present, is apparently weakly chemically-bound in the resin, it is subject to cleavage from the resin molecule and, while the boron electrodeposits with the resin and is found in the electrodeposited film, the boron may be removed from the water-containing medium, in whole or in part, by separation means, such as electrodialysis or ultrafiltration, in the form of boric acid.

Thus, the resin in aqueous medium can be characterized as a water-containing medium containing an ungelled water-dispersible epoxy resin having at least one 1,2-epoxy group per average molecule, and chemically-bound quaternary onium base salts.

The preferred ammonium resin contains from about 0.05 to about 16 percent by weight of nitrogen, at least about one percent of said nitrogen and preferably about 20 percent, more preferably about 50 percent, and most preferably substantially all of the nitrogen being in the form of chemically-bound quaternary ammonium base salts groups; preferably the remainder of said nitrogen being in the form of amino nitrogen, preferably tertiary amine nitrogen, said water-containing medium containing in the preferred embodiment from about 0.01 to about 8 percent by weight of boron metal contained in boric acid and/or a borate or boric acid complex.

The amine-aldehyde products employed herein are aldehyde condensation products of melamine, urea, benzoguanamine, or a similar compound. They may be water-soluble or they may be organic solvent-soluble. Generally, the aldehyde employed is formaldehyde, although useful products can be made from other aldehydes, such as acetaldehyde, crotonaldehyde, acrolein, benzaldehyde, furfural, and others. Condensation products of melamine, urea and benzoguanamine are the most common and are preferred, but products of other amines and amides in which at least one amino grop is present can also be employed.

For example, such condensation products can be produced from triazines, diazines, triazoles, guanadines, guanamines, and alkyl and arylsubstituted and cyclic ureas, and alkyl and aryl-substituted melamines. Some examples of such compounds are N,N'-dimethyl urea, benzyl urea, N,N'-ethyleneurea, diazine diamide, formaguanamine, acetoguanamine, ammeline, 2-chloro-4,6-diamine-1,3,5-triazine, 3,5-diaminotriazole, 4,6-diaminopyrimidine, 2,4,6-triphenyltriamine-1,3,5-triazine, and the like.

These aldehyde condensation products contain methylol groups or similar alkylol groups, depending upon the particular aldehyde employed. Ordinarily, in producing amine-aldehyde condensation products, all or part of these methylol groups are etherified by reaction with an alcohol to produce an alkylated product. In the present, there are employed those condensation products which are substantially completely alkylated. By this it is meant that all or substantially all of the methylol groups have been etherified. Generally speaking, those products containing not more than an average of about one unalkylated alkylol group per molecule are utilized.

Various alcohols can be employed for the etherification of the alkylol groups. These include essentially any monomeric alcohol, with the preferred alcohols being methanol, ethanol, propanol, butanol, and other lower alkanols having up to about 5 carbon atoms, including isomers such as 2-methyl-1-propanol. There can also be employed alcohols such as the lower alkyl monoethers of ethylene glycol and the like; for instance, ethyl Cellosolve and butyl Cellosolve. Higher alcohols can be used but are less desirable because they tend to affect the film properties of the baked film. When the alkylated amine-aldehyde condensate is to utilized in a vehicle to be employed in a water-dispersed coating composition, it is preferred to employ a water-soluble alcohol in the etherification.

The amine-aldehyde condensation products are produced in a manner well-known in the art, using acidic or basic catalysts and varying conditions of time and temperature. The aldehyde is often employed as a solution in water or alcohol, and the condensation, polymerization and etherification reactions may be carried out either sequentially or simultaneously.

The methylol phenol ethers employed herein are compositions consisting essentially of one or more methylol phenol ethers of the formula:

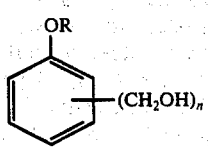

where n is an integer from 1 to 3 and R is an unsaturated aliphatic group or halogen-substituted unsaturated aliphatic group. The groups represented by R should contain at least 3 carbon atoms and can be, for example, allyl groups (which are preferred) or others such as methallyl, crotyl, butenyl, or the like. The halogen-substituted unsaturated groups represented by R can be various mono- and poly-halogenated derivatives of the above unsaturated aliphatic groups, for example, 1-chloroallyl, 3-chloroallyl, 3-chloro-2-methallyl, 1-chloro-2-butenyl, and corresponding groups containing other halogens such as bromine and fluorine.

The methylolphenol ether compositions employed herein are described in U.S. Pat. No. 2,579,330, and as disclosed therein can be produced from sodium or barium salts or 2,4,6-tris(hydroxymethyl)phenols which are obtained by reacting formaldehyde with phenol in the presence of sodium or barium hydroxide. Several methylol phenol ether compositions of this type are commercially available and these generally comprise mixtures of allyl ethers of mono-, di- and trimethylol phenols (substituted in the ortho, para, and meta positions). The trimethylolated derivative is generally the predominant component of the composition. Such commerically available methylol phenol ether compositions are preferred for use in the invention.

The proportion of amine-aldehyde products and/or phenol ether and quaternary-containing resin in the coating composition can be varied considerably. The optimum amount employed depends upon the particular properties desired in the product and also depends in part on the particular quaternary onium group-containing resin. In the preferred products, the amine-aldehyde products or the phenol ethers comprise from about 2 to about 30 percent by weight, based on the weight of the combination with quaternary onium group-containing resins, although as little as one percent give some degree of improvement in properties of the composition and as much as about 50 percent can be utilized in some cases. Where both amine-aldehyde product and phenol ether are utilized, generally a combined weight of between about one percent and about 50 percent by weight may be employed, preferably between about two percent and about 30 percent. The ratio of amine-aldehyde product and phenol ether is generally about 100:1 to 1:100, and preferably between about 5:1 and 1:5.

The concentration of the product in water depends upon the process parameters to be used and is, in general, not critical, but ordinarily the major proportion of the aqueous composition is water, e.g., the composition may contain from one to 25 percent by weight of the resin. Preferably, the electrodepositable compositions of the invention contain a coupling solvent. The use of a coupling solvent provides for improved deposited film appearance. These solvents include hydrocarbons, alcohols, esters, ethers, and ketones. The preferred coupling solvents include monoalcohols, glycols and polyols as well as ketones and ether alcohols. Specific coupling solvents include isopropanol, butanol, isophorone, Pentoxane (4-methoxy-4-methyl pentanone-2), ethylene and propylene glycol, the monomethyl, monoethyl and monobutyl ethers of ethylene glycol, 2-ethylhexanol, and hexyl Cellosolve. The presently preferred coupling solvent is 2-ethylhexanol. The amount of solvent is not unduly critical, generally between about 0.1 percent and about 40 percent by weight of the dispersant may be employed, preferably between about 0.5 and about 25 percent by weight of the dispersant is employed.

In most instances, a pigment composition and, if desired, various additives such as anti-oxidants, surfactants, or wetting agents, for example, Foam Kill 639 (a hydrocarbon oil-containing inert diatomaceous earth), as well as glycolated acetylenes (the Surfynols, for example), sulfonates, sulfated fatty amides, and alkylphenoxypolyoxyalkylene alkanols, and the like are included. The pigment compositon may be of any conventional type, comprising, for example, iron oxides, lead oxides, strontium chromate, carbon black, titanium dioxide, talc, barium sulfate, as well as color pigments such as cadmium yellow, cadmium red, chromic yellow, and the like.

In the electrodeposition processes employing the aqueous coating compositions described above, the aqueous composition is placed in contact with an electrically-conductive anode and an electrically-conductive cathode, with the surface to be coated being the cathode, while in contact with the bath containing the coating composition, an adherent film of the coating composition is deposited on the cathode. This is directly contrary to the processes utilizing polycarboxylic acid resins, as in the prior art, and the advantages described are, in large part, attributed to this cathodic deposition.

The conditions under which the electrodeposition is carried out are, in general similar to those used in electrodeposition of other types of coatings. The applied voltage may be varied greatly and can be, for example, as low as one volt or as high as several thousand volts, although typically between 50 and 500 volts. The current density is usually between about 1.0 ampere and 15 amperes per square foot, and tends to decrease during electrodeposition.

The method of the invention is applicable to the coating of any conductive substrate, and especially metals such as steel, aluminum, copper, magnesium and the like. After deposition, the coating is cured, usually the baking at elevated temperatures. Temperatures of 250° F. to 500° F. for one to 30 minutes are typical baking schedules utilized.

During the cure, especially at elevated temperatures, at least a substantial portion of the quaternary ammonium base decomposes to tertiary amine nitrogen, which aids in the crosslinking of the coating, which upon curing is infusible and insoluble. The presence of boron salts and complexes in the film increases the rate of crosslinking, reduces the temperatures necessary for acceptable curing in commercially-reasonable times and produces coatings with improved hardness and corrosion resistance.

Illustrating the invention are the following examples, which, however, are not to be construed as limiting the invention to their details. All parts and percentages in the examples, as well as throughout the specification are by weight unless otherwise specified.

EXAMPLE A

Into a reactor equipped with thermometer, stirrer, distillation apparatus with reflux and water trap, and means for providing an inert gas blanket were charged 741.6 parts of dimethylethanolamine, 714 parts lactic acid and 300 parts toluene. The reaction mixture was heated to between 105° C. and 110° C. for 4 hours. A total of 120 parts of water were collected with an index of refraction of $n_D{}^{25}$ 1.377. There was then added 245 parts of boric oxide, and 728 parts neopentyl glycol. The reaction mixture was heated between 115° C. and 128° C. for approximately 4 hours, collecting an additional 205 parts of water reaction $n_D{}^{25}$ 1.386. The reaction product had a percent nitrogen content of 4.51 and has a proposed structure of:

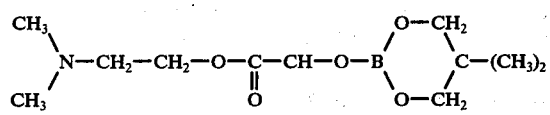

This product is hereinafter referred to as the product of Example A.

EXAMPLE I

A quaternary ammonium salt group-containing resin was prepared as follows:

Into a reactor equipped with thermometer, stirrer, reflux condenser and means for providing an inert gas (nitrogen) blanket were charged 1700 parts of Epon 829 and 302 parts of Bisphenol A. The reaction mixture was heated with stirring to 180° C. under nitrogen, and an exotherm was noted. The reaction mixture was held at 180° C. to 190° C. for 45 minutes, then cooled to 100° C. There was then added 790 parts of a polypropylene glycol (molecular weight approximately 625) and the mixture heated to 130° C., at which time five parts of dimethyl ethanolamine was added. The reaction mixture was held at 130° C. to 140° C. for about 7 hours until the reaction mixture had a Gardner-Holdt viscosity of L+, measured at 50 percent solids in 90/10 isophorone/toluene mixture.

The resultant product had the following analytical values (adjusted to 100 percent solids): epoxy equivalent 797, hydroxyl value 282.

To the above reaction product was then added a solution of 15.2 parts of Foam Kill 639 in 200 parts of 2-ethylhexanol at 119° C. There was then added 3.5 parts of 90 percent formic acid (to neutralize the amine catalyst) and then added 135 parts of isopropanol, cooling the reaction mixture to 100° C.

At 87° C. there was added a solution of 318 parts of the amine salt of Example A, 80 parts of isopropanol and 200 parts of deionized water. The reaction mixture was then heated at 91 ° C. to 94° C. for 75 minutes and there was then added a mixture of 520 parts of deionized water and 135 parts of isopropanol. The final reaction product contained 65.7 percent solids and had a Brookfield viscosity of 55,000 centipoises at 25° C.

The final reaction product had the following analytical values (adjusted to 100 percent solids): epoxy equivalent 1335; hydroxyl value 202.

EXAMPLE II

A pigment paste was prepared by mixing the following and grinding to a Hegmann No. 7 in a suitable pigment dispersing apparatus:

| | Parts by Weight |
|---|---|
| Resin of Example I | 180.0 |
| Titanium dioxide | 544.0 |
| Aluminum silicate | 62.4 |
| Red iron oxide | 1.32 |
| Yellow iron oxide | 13.55 |
| Carbon black | 2.25 |
| Deionized water | 257.0 |

EXAMPLE III

The following materials were stirred mechanically in a vessel until a uniform consistency was obtained: the resin of Example I, the pigment paste of Example II and, where employed, either an amine-aldehyde condensation product or a methylol phenol ether or the combintion of the two. The dionized water was added while stirring, producing an aqueous paint bath of approximately 10 percent non-volatile solids. Steel panels were electrodeposited as described below.

The panels tested in salt spray were zinc phosphated treated steel panels (Bonderite 37) electrocoated at a bath temperature of 80° F. for 90 seconds. Voltage was varied to achieve film build. The films were baked at 400° F. for 20 minutes and scribed in the form of an X to bare metal. The panels when removed were scraped and tape tested for film lifting.

TABLE I

| | 1 | 2 | 3 | 4 | 5 | 6 | 7 | 8 | 9 |
|---|---|---|---|---|---|---|---|---|---|
| Resin of Example I | 210.0 | 172.0 | 158.0 | 156.5 | 195.0 | 158.5 | 156.5 | 158.0 | 158.5 |
| Pigment Paste of Example II | 69.0 | 69.0 | 69.0 | 69.0 | 69.0 | 69.0 | 69.0 | 69.0 | 69.0 |
| Deionized water | 1640 | 1635 | 1635 | 1640 | 1625 | 1640 | 1640 | 1640 | 1625 |
| Benzoguanamine-formaldehyde resin (XM-1123) | — | 25.0 | 34.5 | 25.0 | — | — | — | — | — |
| Phenol ether resin (92.5% solids in xylene - Methylon 75108) | — | — | — | 10.3 | 10.3 | — | 10.3 | — | 10.3 |
| Urea formaldehyde resin (60% solids) | — | — | — | — | — | 57.5 | 41.7 | — | — |
| Melamine-formaldehyde resin (XM-1116) | — | — | — | — | — | — | — | 34.5 | 25.0 |
| Bonderite 37 Panels | 1 | 2 | 3 | 4 | 5 | 6 | 7 | 8 | 9 |
| Volts | 250 | 250 | 300 | 250 | 250 | 250 | 175 | 200 | 200 |
| Film build (mils) | .75-.8 | .75-.8 | .8 | .8 | .8 | .8 | .8 | .8 | .8 |
| Film appearance | non-glossy sandy surface | gloss, slight pigskin | glossy, smooth | high gloss, smooth | gloss, slightly rough | dull, smooth | moderate gloss | dull, slightly rough | smooth, glossy |
| 144 hours salt spray | pinhole rust on 50% of surface, | smooth, minor scribe creepage | OK | OK | OK | OK | OK | 15-20% pinhole rusting | OK |

TABLE I-continued

| | no creepage or lifting | | | | | | | | |
|---|---|---|---|---|---|---|---|---|---|
| 263 hours salt spray | pinhole rust 60% of surface, no creepage or lifting | smooth, 1.0 mm. scribe creepage | OK | OK | OK | 10% pinhole rust, no scribe creepage | 20% pinhole rust, no scribe creepage | 25% pinhole rust | OK |
| 500 hours salt spray | pinhole rust on 85% of surface | smooth, 3.0 mm. scribe creepage | smooth, 1.0 mm. scribe creepage | smooth, 1.0 mm. scribe creepage | no scribe creepage, <1% pinhole | 50% pinhole rust | Rust on 40% of surface | Rust on 50% of surface | smooth, 1 mm. scribe creepage and <1% pinhole |

In addition, the same compositions were coated on calcium-zinc phosphate treated steel panels (Metabond-36) and baked at 450° F. for 20 minutes, with film thicknesses of 0.8-1.0 mils and tested for detergent resistance.

One percent Tide detergent dissolved in deionized water was stirred mechanically at 72° C.-74° C. (160° F.-165° F.). The electrocoated panels were hung in the detergent solution. The panels were inspected daily and removed when blister failure occurred.

All modified films displayed improved detergent resistance. The films containing phenol ethers were especially improved.

According to the provisions of the Patent Statutes, there are described above the invention and what are not considered to be its best embodiments; however, within the scope of the appended claims, it is to be understood that the invention can be practiced otherwise than as specifically described.

We claim:

1. A method of electrocoating an electrically conductive surface serving as a cathode in an electrical circuit comprising said cathode, and anode and an aqueous electrodepositable composition wherein the electrodepositable composition comprises an aqueous dispersion of
   a. a quaternary onium salt group solubilized synthetic organic resin, wherein the onium group is selected from the group consisting of ammonium, sulfonium, and phosphonium, and
   b. 2 to about 30 percent by weight based on total weight of (a) and (b) of an amine/aldehyde condensate.

2. A method as in claim 1 wherein (b) is an alkylated amino triazine/formaldehyde condensate.

3. A method as in claim 2 wherein (b) is a benzoquanamine/formaldehyde condensate.

4. A method of electrocoating an electrically conductive surface serving as a cathode in an electrical circuit comprising said cathode, an anode and an aqueous electrodepositable composition wherein the electrodepositable composition comprises an aqueous dispersion of
   a. a quaternary onium salt group solubilized synthetic organic resin, wherein the onium group is selected from the group consisting of ammonium, sulfonium, and phosphonium, and
   b. 2 to about 30 percent by weight based on total weight of (a) and (b) of an unsaturated methylol phenyl ether.

5. A method as in claim 4 wherein the dispersions contain in addition
   c. an amine/aldehyde condensate 6. A method as in claim 5 wherein (c) is an alkylated amino triazine/formaldehyde condensate.

7. A method as in claim 6 wherein (c) is a benzoguanamine/formaldehyde condensate.

8. A method of electrocoating an electrically conductive surface serving as a cathode in an electrical circuit comprising said cathode, an anode and an aqueous electrodepositable composition wherein the electrodepositable composition comprises an aqueous dispersion of
   a. an epoxy group containing quaternary onium salt group solubilized synthetic organic resin, wherein the onium group is selected from the group consisting of ammonium, sulfonium, and phosphonium, and
   b. 2 about 30 percent by weight based on total weight of (a) and (b) of amine/aldehyde condensate.

9. A method as in claim 8 wherein (b) is an alkylated amino triazine/formaldehyde condensate.

10. A method as in claim 9 wherein (b) is a benzoguanamine/formaldehyde condensate.

11. A method of electrocoating an electrically conductive surface serving as a cathode in an electrical circuit comprising said cathode, an anode and an aqueous electrodepositable composition wherein the electrodepositable composition comprises an aqueous dispersion of
    a. an epoxy group containing quaternary onium salt group solubilized synthetic organic resin, wherein the onium group is selected from the group consisting of ammonium sulfonium and phosphonium, and
    b. 2 to about 30 percent by weight based on total weight of (a) and (b) of an unsaturated methylol phenol ether.

12. A method as in claim 11 wherein the dispersions contain in addition
    c. an amine/aldehyde condensate.

13. A method as in claim 12 wherein (c) is an alkylated amino triazine/formaldehyde condensate.

14. A method as in claim 13 wherein (c) is a benzoguanamine/ formaldehyde condensate.

15. A method as in claim 1 in which the aqueous dispersion comprises a resinous portion comprising
    a. a major amount of an epoxy group-containing quaternary ammonium salt group solubilized synthetic organic resin in which the salt is the salt of an acid having a dissociation constant greater than $1 \times 10^{-5}$, and
    b. a minor amount of a crosslinking resin selected from the group consisting of alkylated amino triazine/formaldehyde resins, unsaturated methylol phenol ethers, and a mixture of alkylated amino triazine/formaldehyde resins and unsaturated methylol phenol ethers.

* * * * *

UNITED STATES PATENT AND TRADEMARK OFFICE
CERTIFICATE OF CORRECTION

PATENT NO. : 4,038,166

DATED : July 26, 1977

INVENTOR(S) : Joseph F. Bosso and Marco Wismer

It is certified that error appears in the above-identified patent and that said Letters Patent are hereby corrected as shown below:

Column 7, line 67, "by" should be --be--.

Column 8, line 13, "wherafter" should be --whereafter--.

Column 9, line 62, insert --organic-- after "other".

Column 10, line 21, "$(R'O)_n COR'-$" should be --$(R'O)_n COR'-$--.

Column 10, line 49, delete ";pO".

Column 12, line 33, insert --amount-- after "that".

Column 13, line 39, insert --unduly-- before "critical".

Column 13, line 53, "amouont" should be --amount--.

Column 16, line 36, insert --invention-- after "present".

Column 17, lines 16-17, "1-chloroallyl" should be --2-chloroallyl--.

Last page, under "Table I-continued" at the end of col. 9, insert --rust on surface--.

Column 21, line 27, "not" should be --now--.

Signed and Sealed this

*First* Day *of November 1977*

[SEAL]

*Attest:*

RUTH C. MASON
*Attesting Officer*

LUTRELLE F. PARKER
*Acting Commissioner of Patents and Trademarks*